Oct. 4, 1966  TOHCHUNG WEI  3,277,279
ELECTRIC HEATER ASSEMBLY FOR SIMULTANEOUSLY
HEATING A PAIR OF VESSELS
Filed Jan. 6, 1964  3 Sheets-Sheet 1

INVENTOR.
TOHCHUNG WEI
BY
Polachek & Saulsbury
ATTORNEYS

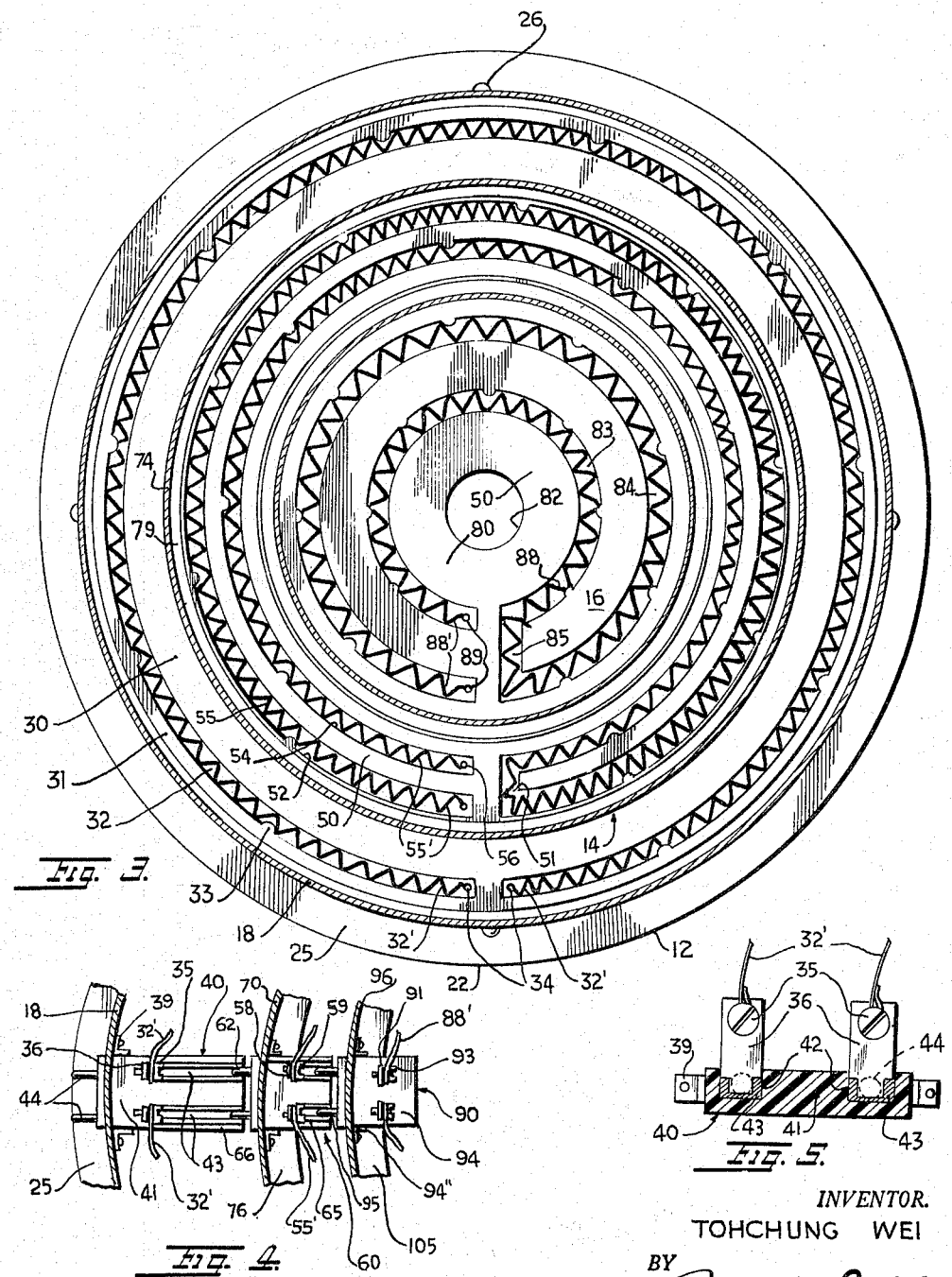

Oct. 4, 1966 TOHCHUNG WEI 3,277,279
ELECTRIC HEATER ASSEMBLY FOR SIMULTANEOUSLY
HEATING A PAIR OF VESSELS
Filed Jan. 6, 1964 3 Sheets-Sheet 3

INVENTOR.
TOHCHUNG WEI
BY Poloeksk & Saulsbury
ATTORNEYS

United States Patent Office 3,277,279
Patented Oct. 4, 1966

3,277,279
ELECTRIC HEATER ASSEMBLY FOR SIMULTANEOUSLY HEATING A PAIR OF VESSELS
Tohchung Wei, 169 E. Broadway, New York, N.Y.
Filed Jan. 6, 1964, Ser. No. 335,928
6 Claims. (Cl. 219—478)

This invention relates to the art of electric heaters.

According to the invention there is provided an assembly of electric heaters disposed in a nested array. The heaters can be used individually independently of each other or as an assembly of two or three heaters. Each of the heaters has an electrical resistance coil connected to an electrical connection. The larger ones of the heaters have sockets in the connectors to engage prongs of the smaller inner heaters. The heaters can be used in conjunction with a stack of food vessels for cooking food or for keeping food in a warm condition.

It is therefore one object of the invention to provide an electric heater assembly including individual annular heater bodies nested concentrically one within the other and electrically connected to an outer connector for applying electric power thereto.

Another object is to provide a heater assembly as described, in which each heater can be removed and used independently of the assembly or in which an outer or inner heater can be removed to leave two heaters assembled for use together.

For further comprehension of the invention, one of the objects and advantages thereof, reference will be had to the following description and accompanying drawings, and to the appended claims in which the various novel features of the invention are more particularly set forth.

In the accompanying drawings forming a material part of this disclosure:

FIG. 3 is a horizontal enlarged cross-sectional view taken on line 3—3 of FIG. 2.

FIG. 4 is a fragmentary horizontal sectional view taken on line 4—4 of FIG. 2.

FIG. 5 is an enlarged sectional view taken on line 5—5 of FIG. 2.

Figure 1:
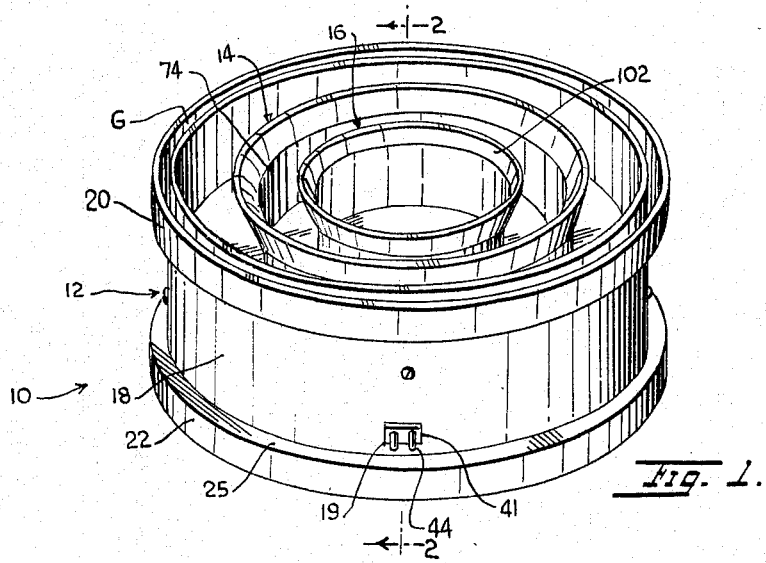
FIG. 1 is a perspective view of an assembly of heaters according to the invention.

Referring first to FIGS. 1–3 and 6, there is shown an assembly 10 of three electric heaters 12, 14 and 16. Heater 12 is the largest one of the heaters and includes a cylindrical wall 18 formed with cylindrical flanges 20 and 22 at top and bottom ends supported by horizontal, annular radial extending flanges 24, 25. The flanges 20, 24 and 22, 25 define endless channels G, G' at the top and bottom of the wall 18 to receive cylindrical walls W and W' of food vessels V and V', indicated by dotted lines in FIG. 2.

Supported concentrically within wall 18 by screws 26 engaged in spacer sleeves 28 is a ceramic ring 30. This ring has a circular groove 31 in its upper side in which is set a coiled resistance heater wire 32. The coiled wire is held in the groove 31 by projections 33 formed integrally with one upper edge of the groove 31. Ends 32' of the wire 32 extend through axially extending holes 34 formed in the ring. The wire ends are engaged by screws 35 on lugs 36 of an electrical connector 40. The connector is secured by brackets 39 to the inner side of wall 18.

Connector 40 has a base block 41 formed of plastic, heat resistance insulation material. In this block are two spaced recesses 42 in each of which is a channel-shaped contact member 43; see FIGS. 2, 4 and 5. Prongs 44 are set in the block 41 and connected with lugs 36 and contact members 43ª, 43ᵇ. A socket connector 45 attached to a cable 46 terminating in a power plug 49 can be engaged with prongs 44 for supplying electric power to the heater wire 32. Block 41 is set in a hole 19 in wall 18.

Figure 2:
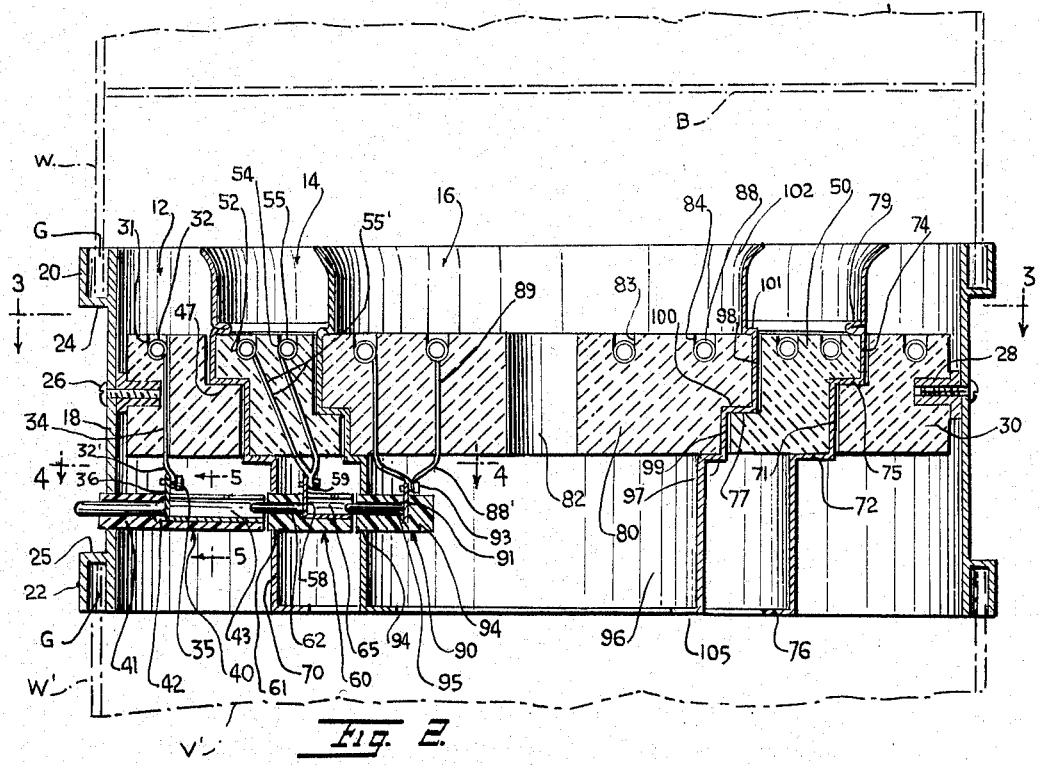
FIG. 2 is an enlarged vertical cross-sectional view taken on line 2—2 of FIG. 1.
Figure 6:
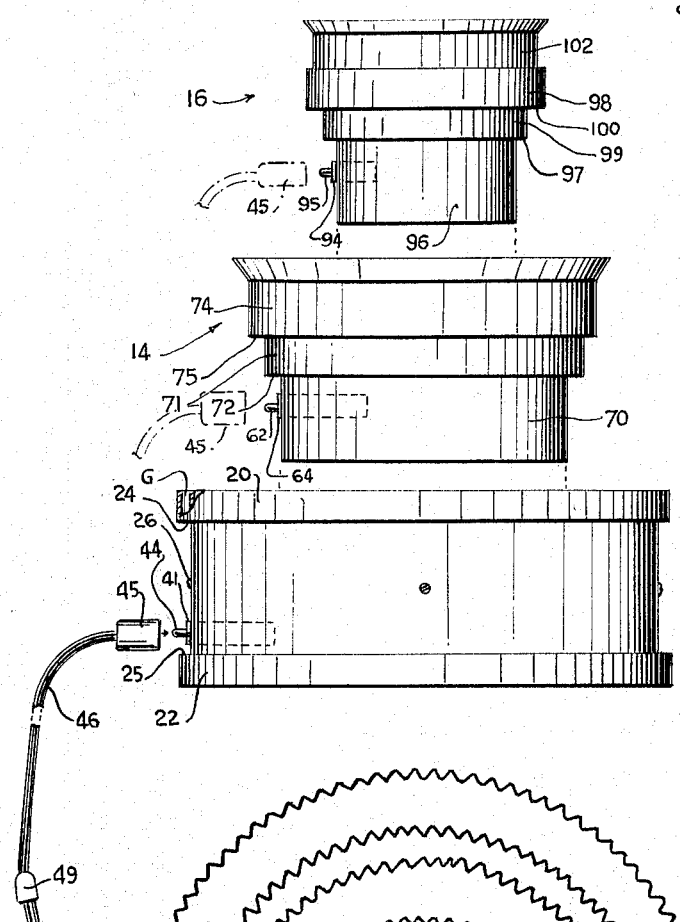
FIG. 6 is an exploded side elevational view showing the heaters of the assembly.

Ring 30 has an inner ledge 47 formed at its upper side on which removably seats heater 14; see FIG. 2. The heater 14 has a ceramic ring 50 on which are two circular grooves 52, 54 joined by a short radial section 51. A coiled resistance heater wire 55 is set in the grooves 51–53; see FIG. 3. Ends 55' of the wire are passed through holes 56 and terminate at lugs 58 of an electrical connector 60. The wire ends 55' are engaged by screws 59. Prongs 62 are connected to the lugs in the connector body 64. Channel-shaped contact elements 65 are set in recesses 66 in the block and extend inwardly radially of the block. Prongs 62 engage in the channel-shaped contact members 43 of the connector 40. The connector 60 is set in a hole 61 and is secured by brackets 67 to the inner side of bottom cylindrical metal wall section 70 of the heater. The heater has an intermediate cylindrical section 71 offset from section 70 by a radially extending annular shoulder 72 engaged under the periphery of ring 50. The wall of the heater has a further upper cylindrical section 74 offset by a radially extending annular shoulder 75 from section 71.

Wall section 74 extends upwardly of the ring 50 and flares outwardly at its upper end. At its lower end, the wall of the heater has an inwardly extending annular radial flange 76 coplanar with the bottom edges of wall 18 of heater 12. The shoulder 75 of the heater wall seats on ledge 47 of ring 30. An annular flange 79 is engaged on top of ring 50 at its periphery.

A ledge 77 is formed on the inner side of ring 50. Heater 16 seats removably on ledge 77. Heater 16 has a flat ceramic ring 80 formed with a central hole 82. On the upper side of the ring 80 are circular grooves 83, 84 joined by a radial groove section 85. In grooves 83–85 is set a coiled resistance heater wire 88. Ends 88' of this wire pass through holes 89 in the ring and terminate at lugs 91 of an electrical connector 90. Screws 93 secure the wire ends to lugs 91.

The connector 90 has an insulated, plastic base block 94 in which the lugs 91 are embedded. The lugs are connected to inner ends of prongs 95. The prongs 95 extend radially outward of the cylindrical wall section 96 of the heater and engage in contact elements 65 of connector 60. Block 94 is set in hole 94' and is held by brackets 94".

The heater 16 has an intermediate metal wall section 99 offset from section 96 by a radial annular flange 97. The heater has an upper wall section 98 offset from section 99 by radial flange 100. Flange 100 seats on ledge 77 of ring 50. The wall of the heater 16 has a radially inwardly extending flange 101 engaged on the upper periphery of the ring 80. Flange 97 engages under the bottom periphery of the ring 80. A top wall section 102 extends upwardly from flange 101 and flares outwardly at its upper end. The upper ends of wall sections 102 and wall sections 75 are coplanar with the upper edge of wall 18. The lower end of the wall 99 of heater 16 is formed with an inwardly extending radial flange 105 coplanar with flange 76.

When the heaters are separate from each other the socket connector 45 can be engaged with prongs 44 of heater 12; or with prongs 62 of heater 14; or with prongs 95 of heater 16. Either the heater 12 or the heater 16 can be removed from the assembly leaving a heater assembly 14, 16 or 12, 14. The socket connector 45 can be engaged on the outwardly extending prongs 62 of assembly 14, 16 to heat the wires 55, 88 of this assembly. The socket connector 45 can be engaged on the outwardly extending prongs 44 to heat the wires 32, 55 of assembly 12, 14. Different heating intensities can be applied to the food vessels under which the heater assemblies are disposed. If the heaters 14 and 16 are used alone or assembled together they will be disposed underneath the bottom B of the vessel V. Since ring 80 has a central hole, some heat will be transmitted from heated wires 32, 55, 88 through this hole to keep food in the lower vessel V' in a warm condition. Also, the bottom B of vessel V will reflect heat through the central hole in ring 30, 50 or 80 to vessel V'.

Figure 7:
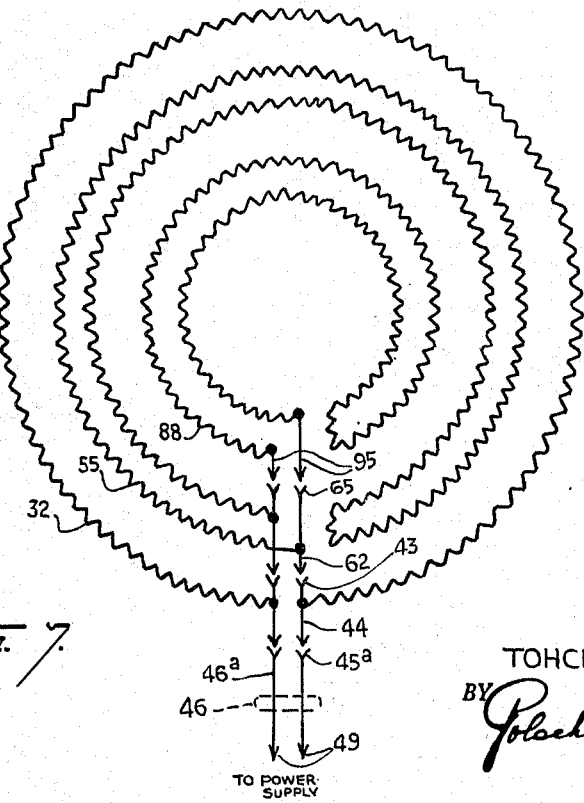
FIG. 7 is an electrical diagram of the heater assembly.

FIG. 7 shows the several heater wires 32, 55, 58. The prongs 95 electrically connected to wire 88 are removably engaged with contact members 65 to which prongs 62 are connected. The ends of wire 55 are also connected to prongs 62. Prongs 62 removably engage with contact members 43 to which ends of wire 32 are connected. Prongs 44 are connected to contact members 43 and are detachably engaged with socket elements 45a to which wires 46a of cable 46 are connected. Cable 46 terminates in plug 49.

The assembly described provides a very versatile heater arrangement for varying the heat applied food vessels. Any one, two or three heaters can be used together making possible six different heating intensities selectable at will. The inner heaters are easily lifted out of the outer heaters and the engaged prongs and channel-shaped contact members of the electrical connector disengage easily.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An electric heater assembly, comprising a cylindrical wall, a cylindrical refractory ring supported within said wall in axial alignment therewith between ends of said wall, said ring having a groove in one side thereof, a coiled resistance heater wire in said groove, and an electrical connector extending outwardly through said wall for connection of an external power supply thereto, said connector having socket terminals extending radially inward of said wall, opposite ends of said wire being connected to said socket terminals respectively, said ring having a central hole with a ledge formed therein; a second cylindrical wall removably seated on said ledge in said ring, a second cylindrical refractory ring supported within said second wall in axial alignment therewith, said second ring having a second groove in one side thereof, a second coiled resistance heater wire in said second groove, a second electrical connector extending outwardly through said second wall and detachably engaged with the socket terminals of the first-named connector, whereby said second wall and ring are removable from the first-named ring through said central hole, said second wire having opposite ends connected to the second connector, whereby power applied to the first-named connector energizes the resistance heater wires in the first and second rings.

2. An electric heater assembly, comprising a cylindrical wall, a cylindrical refractory ring supported within said wall in axial alignment therewith between ends of said wall, said ring having a groove in one side thereof, a coiled resistance heater wire in said groove, and an electrical connector extending outwardly through said wall for connection of an external power supply thereto, said connector having socket terminals extending radially inward of said wall, opposite ends of said wire being connected to said socket terminals respectively, said ring having a central hole with a ledge formed therein; a second cylindrical wall removably seated on said ledge in said ring, a second cylindrical refractory ring supported within said second wall in axial alignment therewith, said second ring having a second groove in one side thereof, a second coiled resistance heater wire in said second groove, a second electrical connector extending outwardly through said second wall and detachably engaged with the socket terminals of the first-named connector, whereby said second wall and ring are removable from the first-named ring through said central hole, said second wire having opposite ends connected to the other contact terminals respectively; said second ring having another central hole with another ledge formed therein, a third cylindrical wall removably seated on said other ledge in said second ring, a third cylindrical refractory ring supported within said third wall in axial alignment therewith, said third ring having a third groove in one side thereof, a third coiled resistance heater wire in said third groove, a third electrical connector extending outwardly through said third wall and detachably engaged with the socket terminals of the second connector whereby said third wall and ring are removable from the second ring through said other central hole, said third wire having opposite ends connected to the third connector, whereby power applied to the first-named connector energizes the resistance heater wires in the first, second and third rings.

3. An electric heater assembly, comprising a cylindrical wall, a cylindrical refractory ring supported within said wall in axial alignment therewith between ends of said wall, said ring having a groove in one side thereof, a coiled resistance heater wire in said groove, and an electrical connector extending outwardly through said wall for connection of an external power supply thereto, said connector having socket terminals extending radially inward of said wall, opposite ends of said wire being connected to said socket terminals respectively, said ring having a central hole with a ledge formed therein; a second cylindrical wall removably seated on said ledge in said ring, a second cylindrical refractory ring supported within said second wall in axial alignment therewith, said second ring having a second groove in one side thereof, a second coiled resistance heater wire in said second groove, a second electrical connector extending outwardly through said second wall and detachably engaged with the socket terminals of the first-named connector, whereby said second wall and ring are removable from the first-named ring through said central hole, said second wire having opposite ends connected to the second connector, whereby power applied to the first-named connector energizes the resistance heater wires in the first and second rings, the first-named cylindrical wall having cylindrical flanges at opposite ends thereof defining endless channels to receive ends of cylindrical vessels in sealing relationship at opposite ends of the first wall, whereby heat is applied to one of said vessels at one end of the first wall directly from the first and second resistance heater wires, said second ring having a central hole therein whereby heat is applied to the other of said vessels at the other end of the first wall through the central hole in the second ring.

4. An electric heater assembly, comprising a cylindrical wall, a cylindrical refractory ring supported within said wall in axial alignment therewith between ends of said wall, said ring having a groove in one side thereof, a coiled resistance heater wire in said groove, and an electrical connector extending outwardly through said wall for connection of an external power supply thereto, said connector having socket terminals extending radially inward of said wall, opposite ends of said wire being connected to said socket terminals respectively, said ring having a central hole with a ledge formed therein; a second cylindrical wall removably seated on said ledge in said ring, a second cylindrical refractory ring supported within said second wall in axial alignment therewith, said second ring having a second groove in one side thereof, a second coiled resistance heater wire in said second groove, a second electrical connector extending outwardly through said second wall and detachably engaged with the socket terminals of the first-named connector, whereby said second wall and ring are removable from the first-named ring through said central hole, said second connector having a pair of other contact terminals extending radially inward of the second wall, said second wire having opposite ends connected to the other contact terminals respectively; said second ring having another central hole with another ledge formed therein, a third cylindrical wall removably seated on said other ledge in said second ring, a third cylindrical refractory ring supported within said third wall in axial alignment therewith, said third ring having a third groove in one side thereof, a third coiled resistance heater wire in said third groove, a third electrical connector extending outwardly through said third wall and detachably engaged with the socket terminals of the second connector whereby said third wall and ring are removable from the second ring through said other central hole, said third wire having opposite ends connected to the third connector, whereby power applied to the first-named connector energizes the resistance heater wires in the first, second and third rings, the first-named cylindrical wall having cylindrical flanges at opposite ends thereof defining endless channels to receive ends of cylindrical vessels in sealing relationship at opposite ends of the first wall, whereby heat is applied to one of said vessels at one end of the first wall directly from the first, second and third heater wires, said third ring having a central hole therein, whereby heat is applied to the other of said vessels at the other end of said first wall through the central hole in the third ring.

6. An electric heater assembly, comprising a cylindrical wall, a cyindrical refractory ring supported within said wall in axial alignment therewith between ends of said wall, said ring having a groove in one side thereof, a coiled resistance heater wire in said groove, and an electrical connector extending outwardly through said wall for connection of an external power supply thereto, said connector having socket terminals extending radially inward of said wall, opposite ends of said wire being connected to said socket terminals respectively, said ring having a central hole with a ledge formed therein; a second cylindrical wall removably seated on said ledge in said ring, a second cylindrical refractory ring supported within said second wall in axial alignment therewith, said second ring having a second groove in one side thereof, a second coiled resistance heater wire in said second groove, a second electrical connector extending outwardly through said second wall and detachably engaged with the socket terminals of the first-named connector, whereby said second wall and ring are removable from the first-named ring through said central hole, said second connector having a pair of other contact terminals extending radially inward of the second wall, said second wire having opposite ends connected to the other contact terminals respectively; said second ring having another central hole with another ledge formed therein, a third cylindrical wall removably seated on said other ledge in said second ring, a third cylindrical refractory ring supported within said third wall in axial alignment therewith, said third ring having a third groove in one side thereof, a third coiled resistance heater wire in said third groove, a third electrical connector extending outwardly through said third wall and detachably engaged with the socket terminals of the second connector whereby said third wall and ring are removable from the second ring through said other central hole, said third wire having opposite ends connected to the third connector, whereby power applied to the first-named connector energizes the resistance heater wires in the first, second and third rings, the first-named wall having a cylindrical flange at one end thereof defining an endless channel to receive one end of a cylindrical vessel in sealing relationship, whereby heat is applied to said vessel directly from the first, second and third heater wires.

5. An electric heater assembly, comprising a cylindrical wall, a cyindrical refractory ring supported within said wall in axial alignment therewith between ends of said wall, said ring having a groove in one side thereof, a coiled resistance heater wire in said groove, and an electrical connector extending outwardly through said wall for connection of an external power supply thereto, said connector having socket terminals extending radially inward of said wall, opposite ends of said wire being connected to said socket terminals respectively, said ring having a central hole with a ledge formed therein; a second cylindrical wall removably seated on said ledge in said ring, a second cylindrical refractory ring supported within said second wall in axial alignment therewith, said second ring having a second groove in one side thereof, a second coiled resistance heater wire in said second groove, a second electrical connector extending outwardly through said second wall and detachably engaged with the socket terminals of the first-named connector, whereby said second wall and ring are removable from the first-named ring through said central hole, said second wire having opposite ends connected to the second connector, whereby power applied to the first-named connector energizes the resistance heater wires in the first and second rings, the first-named wall having a cylindrical flange at one end thereof defining an endless channel to receive one end of a cylindrical vessel in sealing relationship, whereby heat is applied to said vessel directly from the first and second heater wires.

References Cited by the Examiner

UNITED STATES PATENTS

| | | | |
|---|---|---|---|
| 1,706,015 | 3/1929 | Wiegand | 219—445 |
| 1,948,402 | 2/1934 | Teller et al. | 219—478 |
| 1,970,075 | 8/1934 | Buckland | 219—454 |
| 2,180,602 | 11/1939 | Morgan | 219—460 X |
| 2,259,328 | 10/1941 | Sinninger | 339—190 |
| 2,510,116 | 6/1950 | Kaplan | 219—454 |
| 2,689,903 | 9/1954 | Radley | 219—446 |
| 3,140,389 | 7/1964 | Windes | 219—447 |

ANTHONY BARTIS, *Primary Examiner.*

V. Y. MAYEWSKY, *Assistant Examiner.*